HYDROGENATED BLOCK COPOLYMERS OF BUTADIENE
AND A MONOVINYL ARYL HYDROCARBON
Original Filed Jan. 20, 1964

INVENTOR:
ROBERT C. JONES
BY: William H. Myers
HIS AGENT

United States Patent Office

Re. 27,145
Reissued June 22, 1971

27,145

HYDROGENATED BLOCK COPOLYMERS OF BUTADIENE AND A MONOVINYL ARYL HYDROCARBON

Robert C. Jones, San Francisco, Calif., assignor to Shell Oil Company, New York, N.Y.

Original No. 3,431,323, dated Mar. 4, 1969, Ser. No. 338,795, Jan. 20, 1964. Application for reissue May 20, 1969, Ser. No. 848,755
Int. Cl. C08f *15/04*
U.S. Cl. 260—880 10 Claims

Matter enclosed in heavy brackets [ ] appears in the original patent but forms no part of this reissue specification; matter printed in italics indicates the additions made by reissue.

ABSTRACT OF THE DISCLOSURE

Hydrogenated block copolymers having a superior combination of physical properties are prepared by block polymerizing a vinyl arene with butadiene in the presence of a polar compound to cause a limited amount of branching in the polybutadiene block and thereafter hydrogenating the polymer.

Figure 1:
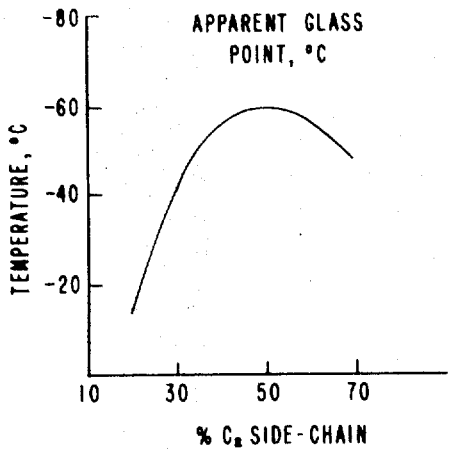

This invention is concerned with novel block copolymers, their compositions and processes for their preparation. More particular, the invention is directed to certain hydrogenated block copolymers having optimum physical properties based upon a critical microstructure of the elastomeric polymeric blocks contained therein.

Rubbers and elastomers of either natural or synthetic origin normally require vulcanization in order to obtain useful elastomeric properties. Before vulcanization, rubbers possess tacky properties and low strength which makes them of little utility except as rubber cements. Another of their prime shortcomings is that of stability relative to either heat or oxidation.

Optimum elastomeric properties are not usually attained until the rubber has been subjected to a vulcanization treatment such as by means of heating with sulfur, sulfur compounds, peroxides or other means. Vulcanization usually results in insolubilization of the rubber in most common solvents. While this may be of advantage in certain situations, for many purposes such as the application of paints, etc., and in the formation of molded objects, insolubilization is in fact a substantial disadvantage. It has been necessary in many cases to apply vulcanized rubbers in the form of latices or to vulcanize the rubber after it has been formed in a molding operation or the like. Vulcanization under such circumstances often results in substantial losses of product, since the flashings from moldings etc., cannot be readily reworked but must be incorporated in other compositions acting merely as a filler or reinforcing agent.

It would be desirable to have a rubber which behaves like a vulcanized rubber without the necessity for vulcanization, as well as having the property of being soluble in a selected class of relatively inexpensive solvents such as certain hydrocarbons. Recently, a critically limited class of block copolymers has been investigated to determine the optimum structure for obtaining these combinations of properties. The block copolymers under consideration comprise primarily those having a general structure

A—B—A wherein the two terminal polymer blocks A comprise thermoplastic polymer blocks of vinylarenes such as polystyrene, while block B is a polymer block of a conjugated diene. The proportion of the thermoplastic terminal blocks to the center elastomeric polymer block and the relative molecular weights of each of these blocks is balanced to obtain a rubber having an optimum combination of properties such that it behaves as a vulcanized rubber without requiring the actual step of vulcanization. Moreover, these block copolymers can be designed not only with this important advantage but also so as to be handled in thermoplastic forming equipment and are soluble in a variety of relatively low cost solvents.

While these block copolymers have a number of outstanding technical advantages, one of their principal limitations lies in their sensitivity to oxidation. This is due to their unsaturated character which can be minimized by hydrogenating the copolymer, especially in the center section comprising the polymeric diene block. Hydrogenation may be effected over the entire molecule, converting the terminal blocks such as polystyrene to polyvinylcyclohexane blocks, while the diene polymer block is converted to a straight chain hydrocarbon having a relatively high degree of saturation, this portion of the block copolymer having properties similar to polymers of alpha olefins.

The elastomeric properties of certain alpha olefin polymers appear to be due in part to their degree of branching. While the alpha olefin polymers have a basic straight carbon chain backbone, those with elastomeric properties always have dependent alkyl radicals. For example, EPR (ethylene-propylene rubber) has a structure of dependent methyl radicals which appears to provide elasticity and other elastomeric properties. When an essentially unbranched straight chain polymer is formed, such as some polyethylenes, the resulting polymer is essentially nonelastomeric or in the other words relatively rigid, and behaves like a typical thermoplastic without possessing resilience, elongation, tensile strength without yield, low set or other properties characteristic of desirable elastomers.

The problem therefore exists of forming a block copolymer having the "self-curing property" discussed hereinbefore, solubility in relatively low cost solvents, stability toward oxidation and retention of the elastomeric properties over a wide temperature range in spite of hydrogenation of the polymer to obtain the desired degree of stability.

Now, in accordance with the present invention, a particular type of block copolymer has been prepared meeting in large measure the above requirements and combining within its structure, a configuration enabling the combination of a maximum number of physical properties especially desirable for such products. These polymers are hydrogenated block copolymers having a configuration, prior to hydrogenation, of A—B—A wherein each of the A's is an alkenyl-substituted aromatic hydrocarbon polymer block and B is a butadiene polymer block wherein 35–55 *mol percent of the condensed butadiene units in the butadiene polymer block have 1,2 configuration.* [% of the carbon atoms present in the butadiene polymer block are in the form of dependent vinyl side chains.]

Still in accordance with this invention, a means has been devised for the preparation of such branched block copolymers which comprises the steps of utilizing an alkyl lithium catalyst in a relatively inert hydrocarbon solvent for the block copolymer at each stage of its formation modified with a critically defined proportion of a polar compound of the group consisting of ethers, thio-ethers and tertiary amines; forming a first polymer block of an alkenyl aromatic hydrocarbon in said medium to form a living polymer block; adding butadiene thereto and continuing polymerization until the desired weight has been obtained; thereafter introducing an alkenyl arene and continuing block copolymerization to finally obtain the A—B—A block copolymer wherein the center polybutadiene block has the recited degree of branched configuraion. Following the preparation of this unsaturated block copolymer, the latter is subjected to hydrogenation of such a degree that the unsaturation of the polybutadiene block is reduced to less than 10% of its original value.

The block copolymer having the diene center block at least 90% hydrogenated but less than 10% of the polystyrene units hydrogenated exhibits the dual advantages of improved stability while maintaining good processability. Block copolymers wherein at least about 25% of the polystyrene blocks are hydrogenated have the advantages both improved stability and increased softening points. Such compositions may be mixtures of block copolymers wherein at least part of the molecules are saturated over their entire length, the remaining molecules being those in which only the butadiene polymer block is at least 90% saturated. Alternatively, the hydrogenated polymers may be those in which at least 90% of the polybutadiene linkages are hydrogenated and in which the polystyrene blocks are those containing both saturated and unsaturated styrene units.

The figures forming a part of the specification indicate a number of physical properties of block copolymers of this variety containing a wide range of $C_2$ side chains showing that a critical range between about 35 and 55 *mol percent 1,2 structure,* [% of the carbon atoms in side chains is required] in order to obtain the optimum combination of the most desired properties, while at the same time retaining the benefits of self-curing and the possibility of processing the polymer in thermoforming equipment such as extrusion or other thermoplastic molding devices.

In order to have the most desirable properties, it is preferred to form terminal blocks A having average molecular weights of 4,000–115,000 and polybutadiene blocks having average molecular weights of 20,000–450,000. Still more preferably, the terminal blocks have average molecular weights of 8,000–60,000 while the polybutadiene polymer block has an average molecular weight between about 50,000 and 300,000. Likewise, in order to promote the optimum combination of physical properties, it is desirable that the terminal plastic blocks comprise 5–30% by weight of the total block copolymer.

The proportion of polar modifying compounds to be used in forming the branched polybutadiene blocks in the above types of block copolymers will depend upon a number of factors such as the identity of the polar compound, the precise degree of branching desired, the hydrocarbon medium utilized and the amount of lithium catalyst present. For the purpose of the present invention, the amount of polar compound will be expressed as a molar ratio of polar compound to lithium alkyl. In order to achieve 35–55 *mol percent 1,2 structure,* [% of carbon atoms in dependent side chains,] the molar ratio of polar compound to lithium should be between about 7 and 70, preferably between about 10 and 40.

The degree of branching of the polybutadiene block is essentially linear with the molar ratio of polar compounds to lithium. Consequently, if the ratio is too low, then the desired degree of branching is correspondingly decreased and the resulting block copolymer, when hydrogenated, is essentially a plastic having substantially non-elastomeric properties e.g. poor rubber properties. On the other hand, if the molar proportion is increased beyond the maximum limit recited, the degree of branching is excessive and, as will be seen by reference to the figures, the elastomeric properties of the resulting products following hydrogenation are drastically damaged. Consequently, the major objective of the process is to utilize the correct proportion of polar compound to lithium initiator such that the branching of the polybutadiene block is within the desired recited range of 35–55 mol percent. [, or in other terms, 35–55% of the carbon atoms in the polybutadiene block are in the form of dependent $C_2$ side chains.] While the center elastomeric block is preferably a polymerized butadiene polymer having a recited degree of branching, this may be modified, with about 25% by weight of elastomeric block-producing monomers of other conjugated dienes such as isoprene and the like.

The non-elastomeric end polymer blocks comprise homopolymers or copolymers preferably prepared from alkenyl aromatic hydrocarbons and particularly from vinyl aromatic hydrocarbons wherein the aromatic may be either monocyclic or polycyclic (followed by hydrogenation). Typical monomers include styrene, alpha methyl styrene, vinyl xylene, ethyl vinyl xylene, vinyl naphthalene and the like. Mixtures of such monomers may be utilized as well. The two end blocks may be the same or different as long as they meet the generic description of these end blocks insofar as their thermoplastic character is concerned as differentiated from the elastomeric major of the center block. Where, in the specification, general reference is made to polystyrene blocks, it will be understood that other types of poly(vinyl arenes) may be used in place thereof. The center block may be an elastomer in accordance with the definition contained in ASTM Special Technical Bulletin, No. 184 as follows:

"A substance that can be stretched at room temperature to at least twice its original length and, after having been stretched and the stress removed, returned with force to approximately its original length in a short time."

The catalysts employed in the process of the present invention may be defined broadly as "lithium based initiators" although alkyl lithium initiators are preferred. Other suitable initiators include lithium metal and aryl lithium compounds and in certain instances, dilithium initiators such as dilithium stilbene, lithium 1-diphenyl ethylene or lithium naphthalene. Alkyl lithium initiators, the preferred class, may be generally divided into normal alkyl lithiums and branched alkyl lithiums, the latter having a number of functional aspects making them more desirable than the former. Branched alkyl lithium initiators exhibit no disadvantageous "induction period" in the startup of the polymerization, the rate of polymerization is reasonably rapid but sufficiently steady so that it can be controlled and the products obtained are of a relatively narrow molecular weight range also adding to the product control and effectiveness thereof for a number of purposes.

Polymerization is normally conducted at temperatures in the order of 20° to about 100° C., preferably about +20° C. and 65° C. The proportion of initiators will depend upon the molecular weight of the products desired, but may be varied, with the latter qualification, between about 1 and about 200 parts per million based on the weight of the monomers involved.

The basic process when using the lithium-based catalysts comprises forming a solution of the first alkenyl arene monomer in an inert hydrocarbon such as alkanes, alkenes or cycloalkanes modified by the presence of the polar compounds of the group consisting of ethers, thioethers and tertiary amines. Of course, since the presence of the polar compound is not essential in the formation of the first polymer block with many initiators, it is not essential to introduce the polar compounds at this stage since it may be introduced just prior to or together with addition of the butadiene for the formation of middle elastomeric branch block. Among the polar compounds which may be added in accordance with the one aspect of this invention ae dimethyl ether, diethyl ether, ethyl methyl ether, ethyl propyl ether, dioxane, dibenzyl ether, diphenyl ether, dimethyl sulfide, diethyl sulfide, tetramethylene oxide (tetrahydro furane), tripropyl amine, tributyl amine, trimethyl amine, triethyl amine, pyridine and quinoline. Mixtures of these polar compounds may be employed in the practice of the present invention. The proportion of polar compounds should be restricted in accordance with the limits set forth hereinbefore in order to obtain the desired critical degree of branching in the center elastomeric block.

When the lithium initiator, polar compound, alkenyl aromatic monomer and inert hydrocarbon are combined, polymerization proceeds to produce the first terminal polymeric block having an average molecular weight between about 4000 and 100,000, this block being terminated on one end with a lithium radical and being referred to as a "living polymer." At this time, without further alteration or removal of this lithium radical, butadiene is injected into the system and block polymerization occurs, the presence of the polar compound now becoming important in producing the desired degree of branching of the polybutadiene block. The temperature, initiator concentration and solvent may be adjusted at this time to optimize the desired degree of polymerization or rate of reaction. The resulting product is then typified by the general structure A—B—Li, a living polymer block of the two monomers thus far employed. After this, a second addition of an alkenyl aromatic hydrocarbon is made to produce the final terminal block and result in the formation of the three block system A—B—A which is the result of polymerization followed by termination with a polar terminator such as an alcohol and the like.

Having obtained the basic polymer with the described degree of branching in the center elastomeric butadiene polymer block, the next necessary stage is to hydrogenate the polymer in order to increase its service temperature and at the same time to improve the oxidation stability of the product. Hydrogenation may be conducted utilizing a variety of hydrogenation catalysts such as nickel on kieselguhr, Raney nickel, copper chromate, molybdenum sulfide, and finely divided platinum or other noble metals on a low surface area carrier.

Hydrogenation may be conducted at any desired temperature or pressure, say, from atmospheric to 3000 p.s.i.g., the usual range being between 100 and 1000 p.s.i.g. at temperatures from about 75° F. to 600° F., for times between about 0.1 and 24 hours, preferably 0.2–8 hours. Preferred catalysts comprise the reduced metal products obtained by reduction of cobalt nickel, tungsten or molybdenum compounds with aluminum alkyls or hydrides. These catalysts are selective, in that the diene block is hydrogenated rapidly, while the styrene blocks are more slowly hydrogenated unless hydrogenation temperatures are increased.

Since the polybutadiene block is that most subject to oxidative attack, it is the primary objective of hydrogenation to reduce the unsaturation of this block, the hydrogenation of the terminal plastic blocks being of less importance. With some selective catalysts, this is readily accomplished whereas with others, the hydrogenation proceeds along the entire chain.

To improve the stability of the block copolymers, the diene unsaturation (measured by iodine number) should be reduced to less than 10% (preferably less than 5%) of its original value. Reduction of styrene unsaturation (measured by ultra violet) may be expressed as an average of 0–100%; e.g., no reduction at all, and up to complete reduction. At intermediate reduction levels, it will be understood that the hydrogenation product may be a mixture of products in which some of the polystyrene blocks are hydrogenated more than others.

In order to compare the physical properties of the branched copolymers according to the present invention with those containing either less or more branching in the elasomeric block, a set of block copolymers was prepared having similar individual block molecular weights. While the polar compound was varied relative to the amount of lithium alkyl initiator present, the following is a typical example by which this set of block copolymers were prepared: Styrene (60 grams) was dissolved in benzene (1400 grams) containing varying proportions of tetrahydrofurane as the polar compound. This mixture was brought to 40° C. and 0.003 mol of secondary butyl lithium was added. Polymerization was conducted at 40° C. in a reactor until all of the styrene had been converted to a polymer terminated with a lithium radical. Thereafter, butadiene was added to the reaction mixture (450 grams) and polymerization was continued until complete utilization of the butadiene monomer. The styrene-butadiene block polymer so formed was then modified by the addition of styrene (60 grams) and polymerization continued until no monomer remain: The resulting polystyrene-polybutadiene-polystyrene block polymer had average block molecular weights of 15,000–100,000–15,000.

The block copolymers so prepared by variation in tetrahydrofurane ratio relative to secondary butyl lithium were then hydrogenated at 500 p.s.i.g. hydrogen pressure, for 18 hours at 160° C. utilizing 0.3 gram of nickel on kieselguhr support per gram of polymer. The hydrogenated polymers were then tested for physical properties which are shown in the table below.

Figure 2:
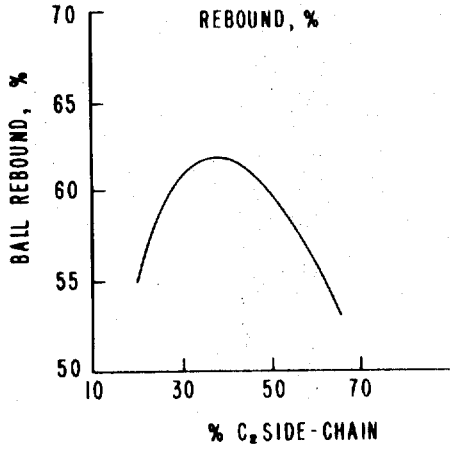
Figure 3:
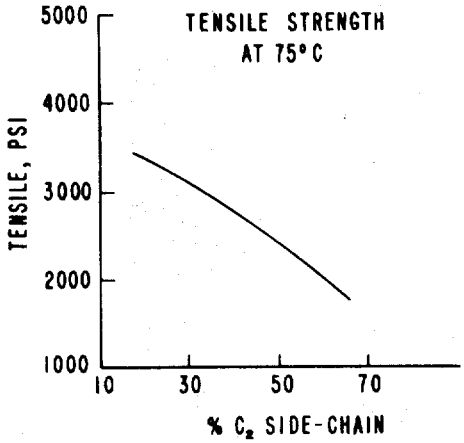
Figure 4:
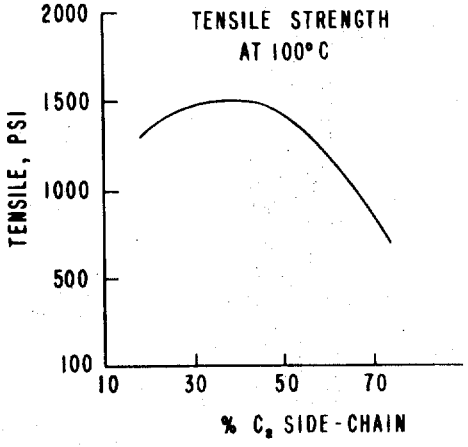

These data were then plotted in part in FIGURES 1–4. It will be evident from a study of these figures and the accompanying table of data that block copolymers wherein the *1,2 content* [side chain content] is between 35 and *55 mol* percent of the elastomeric center block appear to offer the best elastomeric compromise between low temperature resilience and stress-strain properties. At lower side chain levels, lower rebound and higher glass points are experienced. At higher side chain levels, tensile strength decreases along with rebuond, and glass point increases. Furthermore, tensile strength at elevated temperatures suffers at *1,2* [side chain] contents above 55 *mol* percent. When the block copolymers having little or no side chain branching in the center blocks were hydrogenated, the products resulted in a plastic-type polymer of limited solubility presumably due to a degree of crystallinity in the center segment.

PROPERTIES OF HYDROGENATED SBS, PRECURSOR HAVING VARYING 1,2 CONTENT AND 15–100–15×10⁻³ BLOCK LENGTHS

| Run | Precursor, percent 1,2 in butadiene block | I.V., dl./g. (toluene, 25° C.) | $I_2$ No., g.$I_2$/100 g. | Tensile at break, p.s.i. | Modulus 300%, p.s.i. | Modulus 500%, p.s.i. | Elongation at break, percent | Set, percent | Shore A hardness |
|---|---|---|---|---|---|---|---|---|---|
| A | 19 | 1.32 | 0.8 | 7,150 | 1,900 | -------- | 420 | >100 | 88 |
| B | 32 | 1.33 | 1.8 | 5,625 | 625 | 4,150 | 520 | 15 | 67 |
| C | 41 | 1.24 | 1.6 | 5,775 | 450 | 1,050 | 670 | 15 | 65 |
| D | 50 | 1.09, 1.04 | 3.4, 0.7 | 4,800 | 400 | 775 | 770 | 20 | 65 |
| E | 61 | ---------- | 6.0 | 3,900 | 250 | 375 | 1,000 | 20 | 59 |
| F | 67 | ---------- | 6.9 | 3,750 | 250 | 400 | 940 | 32 | 56 |
| G | 7.5 | ---------- | 4.6 | 5,125 | 2,150 | 4,025 | 570 | ~225 | 91 |

I claim as my invention:

1. As a new composition of matter, a hydrogenated block copolymer having the general configuration

A—B—A wherein, prior to hydrogenation.

(1) each A is a polymerized mono alkenyl aromatic hydrocarbon block having an average molecular weight of about 4,000–115,000;

(2) B is a polymerized butadiene hydrocarbon block having an average molecular weight of about 20,000–450,000;

(3) the blocks A constituting 2–33 weight percent of the copolymer;

(4) 35–55 *mol percent of the condensed butadiene units in block B having 1,2-configuration;* [% of the butadiene carbon atoms in block B being vinyl side chains;]

(5) and the unsaturation of block B having been reduced to less than 10% of the original unsaturation.

2. A new composition of matter according to claim 1 wherein prior to hydrogenation the polymeric blocks A are polymer blocks of a vinyl aromatic hydrocarbon.

3. A new composition of matter according to claim 1 wherein the blocks A comprise 5–30% by weight of the copolymer, the unsaturation of block B is reduced to less than 5% of its original value and the average unsaturation of the hydrogenated block copolymer is reduced to less than 20% of the original value.

4. As a new composition of matter, a hydrogenated block copolymer having the general configuration

A—B—A wherein, prior to hydrogenation, (1) each A is a polymerized styrene block having an average molecular weight of about 8,000–60,000;

(2) B is a polymerized butadiene block having an average molecular weight of about 50,000–300,000, 40-50 *mol percent of the condensed butadiene units in block B having 1,2-configuration;* [% of the butadiene carbon atoms in the block being vinyl side-chains;]

(3) the blocks A comprising 5–30% by weight of the copolymer; the unsaturation of block B having been reduced by hydrogenation to less than 10% of its original value.

5. A hydrogenated block copolymer composition ac-according to claim 1 wherein an average of less than about 10% of the mono alkenyl aromatic hydrocarbon units are hydrogenated.

6. A hydrogenated block copolymer composition according to claim 1 wherein an average of more than about 25% of the mono alkenyl aromatic hydrocarbon units are *hydrogenated.* [hydrogeanted.]

7. The process for the preparation of a block copolymer comprising the steps:

(a) polymerizing a mono alkenyl arene in the presence of an inert hydrocarbon solvent and a lithium alkyl catalyst whereby a polymer block A having an average molecular weight of 4,000–115,000 terminated with a lithium ion is formed;

(b) adding butadiene to the lithium-terminated block and block copolymerizing it with said first block in the presence of a polar compound of the group consisting of ethers, thioethers and tertiary amines, the molar ratio of said polar compound to lithium alkyl catalyst being between about 7 and 70, whereby a block copolymer terminated with lithium is formed 35–55 *mol percent of the condensed butdiene units in block B having 1,2-configuration*; [% of the carbon atom in the butadiene polymer block being vinyl side chains,] the butadiene polymer block B having an average molecular weight of 20,000–450,000;

(c) adding thereto a mono alkenyl arene and block polymerizing it with the block copolymer of step (b), to form a block polymer A—B—A;

(d) and hydrogenating the block polymer whereby the unsaturation of the diene polymer block B is reduced to less than 10% of its original value.

8. A process according to claim 7 wherein the polar compound in step (b) is an ether.

9. A process according to claim 7 wherein the mono alkenyl arene is styrene and the polar compound is tetrahydrofuran.

10. A process according to claim 9 wherein the lithium alkyl is a lithium secondary alkyl.

References Cited

The following references, cited by the Examiner, are of record in the patented file of this patent or the original patent.

UNITED STATES PATENTS

| | | | |
|---|---|---|---|
| 3,333,024 | 7/1967 | Haefele | 260—880 |
| 3,140,278 | 7/1964 | Kuntz | 260—879 |
| 3,149,182 | 9/1964 | Porter | 260—879 |
| 3,239,478 | 3/1966 | Harlan | 260—879 |
| 3,251,905 | 5/1966 | Zelinski | 260—879 |
| 3,299,174 | 1/1967 | Kuhre | 260—879 |

OTHER REFERENCES

Kuntz: Journal Polymer Science, vol. 54, pp. 569–586 (1961), pp. 576–577 and 583–584 specifically relied upon.

JAMES A. SEIDLECK, Primary Examiner

R. A. GAITHER, Assistant Examiner

U.S. Cl. X.R.

260—879